United States Patent
Okubo et al.

(10) Patent No.: US 9,321,451 B2
(45) Date of Patent: Apr. 26, 2016

(54) MANAGING RING GEAR TORQUE IN A HYBRID ELECTRIC VEHICLE TO INCREASE AVAILABLE WHEEL TORQUE

(71) Applicant: FORD GLOBAL TECHNOLOGIES, LLC, Dearborn, MI (US)

(72) Inventors: Carol Louise Okubo, Belleville, MI (US); Jonathan Andrew Butcher, Farmington Hills, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/501,828

(22) Filed: Sep. 30, 2014

(65) Prior Publication Data

US 2016/0090074 A1    Mar. 31, 2016

(51) Int. Cl.
| | |
|---|---|
| *B60W 10/00* | (2006.01) |
| *B60W 20/00* | (2006.01) |
| *B60K 6/00* | (2007.10) |
| *B60K 6/42* | (2007.10) |
| *B60W 10/06* | (2006.01) |
| *B60W 10/115* | (2012.01) |
| *B60K 6/445* | (2007.10) |
| *B60K 6/365* | (2007.10) |
| *F16H 37/08* | (2006.01) |

(52) U.S. Cl.
CPC ............... *B60W 20/10* (2013.01); *B60K 6/365* (2013.01); *B60K 6/445* (2013.01); *B60W 10/06* (2013.01); *B60W 10/115* (2013.01); *B60W 2510/083* (2013.01); *B60W 2510/10* (2013.01); *B60W 2520/30* (2013.01); *B60W 2710/0666* (2013.01); *F16H 2037/0866* (2013.01); *Y10S 903/91* (2013.01); *Y10S 903/93* (2013.01)

(58) Field of Classification Search
USPC .................................. 701/22, 36; 180/65.15
See application file for complete search history.

(56) References Cited

U.S. PATENT DOCUMENTS

| 5,299,986 A | * | 4/1994 | Fabris ..................... F16H 48/22 475/231 |
| 5,536,215 A | * | 7/1996 | Shaffer .................. B60K 17/20 475/88 |
| 5,938,556 A | * | 8/1999 | Lowell .................... F16H 48/08 475/233 |
| 7,117,964 B1 | | 10/2006 | Kuang et al. |
| 7,576,501 B2 | | 8/2009 | Okubo et al. |
| 2011/0015811 A1 | | 1/2011 | Okubo et al. |
| 2014/0180441 A1 | * | 6/2014 | Hiasa .................... B60W 20/10 700/22 |

* cited by examiner

*Primary Examiner* — Yonel Beaulieu
(74) *Attorney, Agent, or Firm* — David B. Kelley; Brooks Kushman P.C.

(57) ABSTRACT

A hybrid electric vehicle includes an engine that can selectively provide drive torque to propel the vehicle. An electric machine also selectively provides drive torque. A differential transfers the torque to and amongst wheels. A planetary gearset is coupled to the engine and has a ring-gear for transmitting ring-gear-torque to the differential. A continuous torque transfer member operatively couples the ring-gear and the electric machine to the differential. At least one controller is configured to alter engine output based on a ring-gear-torque-threshold. This enables a desired torque to transfer through the continuous torque transfer member to the differential.

19 Claims, 4 Drawing Sheets

MANAGING RING GEAR TORQUE IN A HYBRID ELECTRIC VEHICLE TO INCREASE AVAILABLE WHEEL TORQUE

TECHNICAL FIELD

The present disclosure relates to altering engine torque in a hybrid vehicle to manage torque transmitted through a ring gear of a planetary gear torque coupled to the engine.

BACKGROUND

Hybrid vehicles are typically driven by two primary power sources, e.g., an internal combustion engine and an electric motor (powered by a battery). One type of hybrid vehicle is a power-split hybrid. A power-split hybrid allows the engine and the electric motor to separately, or in combination, supply power to the wheels. A planetary gear set can be coupled to the engine and to a generator such that the engine can charge the battery even while the electric motor supplies the necessary torque to propel the vehicle. The generator may also act as an electric motor by supplying torque through the planetary gear set. One of the planetary gears (e.g., the ring gear) can also couple the engine and the generator to an output, such as a differential that distributes torque to the wheels.

Particularly at low vehicle speeds, a situation may arise in which the amount of wheel power may be very small even when the wheel torque demand is relatively large. The most extreme of such a scenario is when the vehicle is launching from rest at full accelerator pedal where the wheel speed is zero (and hence the wheel power is also zero), yet the wheel torque demand is at a maximum. Another similar situation may arise when the vehicle is at low or zero speed while on sand or gravel, and the vehicle operator sharply depresses the accelerator pedal. In these and other similar scenarios, with a normal battery state of charge (SOC) the resulting desired engine power corresponds with that which is necessary to overcome losses in the transmission and accessory loads.

Hybrid vehicle architecture should be designed to properly accommodate such driving scenarios while providing torque to the wheels to propel the vehicle as expected. In one type of power-split hybrid, a series of reduction gears transfer torque from the planetary gear set to a differential which distributes the torque among the wheels. For example, in one vehicle, an engine may be connected to a carrier of a planetary gear set, while the sun gear is connected to a generator. Torque output by the engine causes rotation of the sun gear, which turns the generator to either charge a battery or provide drive torque through a traction motor. Additionally, a ring gear of the planetary gear set turns a series of torque reduction gears, ultimately leading to the fraction motor and to an output of the powertrain. Control strategies exist that work to deliver optimum torque to the wheels during the low-speed and high-torque scenarios described above based on the amount of torque transmitted through the ring gear. However, these control strategies account for the series of reduction gears when deciding how much torque to produce from the engine and/or the electric motor.

In another type of power-split hybrid, a chain, belt, or other continuous torque transfer member transfers the torque from the planetary gear set to a differential. No gear reduction is provided.

SUMMARY

According to one embodiment, a vehicle comprises an engine, a planetary gearset, a differential, an electric machine, a continuous torque transfer member, and at least one controller. The planetary gearset is coupled to the engine and has a ring-gear for transmitting a ring-gear-torque to the differential. The electric machine is configured to selectively output torque to the differential. A continuous torque transfer member (CTTM) operatively couples the ring-gear and the electric machine to the differential. The controller(s) is/are configured to alter engine output based on a ring-gear-torque-threshold such that a desired torque transfers through the CTTM to the differential.

The at least one controller may be configured to increase an output of the engine to maintain the ring-gear-torque above a ring-gear-torque-threshold to transfer desired torque through the CTTM to the differential.

A drive member, such as a gear or sprocket, may be coupled to the CTTM to provide torque thereto. The drive member may have a central shaft operatively coupled to the ring gear on one end and the electric machine on the other end.

According to another embodiment, a method of controlling engine output of a vehicle is provided. The vehicle has an engine operatively coupled to a differential via a ring-gear of a planetary gearset and a continuous torque transfer member (CTTM). The vehicle also has a motor operatively coupled to the differential via the CTTM. The method comprises increasing an output of the engine based on an amount of torque transmitted through the ring-gear such that the torque is maintained above a ring-gear-torque-threshold and transferred through the CTTM.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
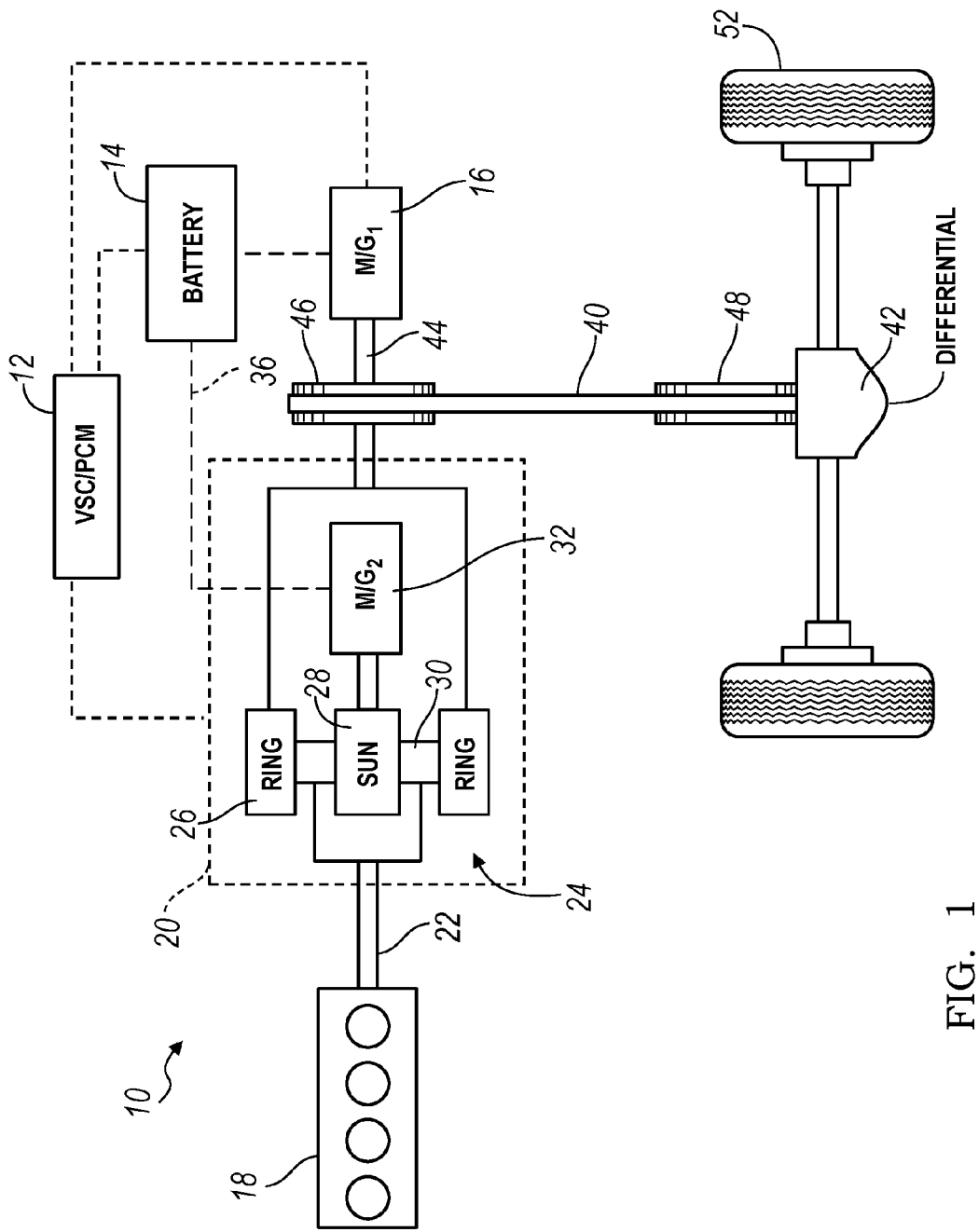
FIG. 1 is a schematic illustration of a power-split hybrid electric vehicle according to one embodiment of the present disclosure.

Referring to FIG. 1, a hybrid electric vehicle (HEV) 10 includes a power-split powertrain. Components of the power-split are described below that enable either or both mechanical and electrical power flow paths toward the wheels. A vehicle system controller (VSC) and/or a powertrain control module (PCM) 12 include one or more controllers in a network of processors and controllers configured to control various components within the powertrain. These controllers can broadly be referred to as one or more "controller." Among other components, the controller 12 controls an electric traction battery 14. The battery 14 has a two-way electrical connection, whereby it receives and stores electric energy (e.g., during regenerative braking) and also supplies the energy to an electric traction motor 16 (or motor/generator, $M/G_1$) for propulsion. The controller 12 also controls the operation of an internal combustion engine (ICE) 18. Both the traction motor 16 and the engine 18 are capable of powering a transmission 20 that ultimately delivers torque to the wheels of the vehicle.

It should be understood that references to a "motor" 16 and a "generator" 32 are made for convenience and distinction. However, either or both of these can generally be referred to as an "electric machine" or motor/generator (M/G). Both the motor 16 and the generator 32 can act as a motor by providing torque to the powertrain, and as a generator by converting mechanical power into electrical energy.

The engine 18 delivers power to a torque input shaft 22 that is connected to a planetary gear set 24. A one-way clutch (not shown) may be provided along the input shaft 22 that selectively connects the engine 18 to the planetary gear set 24. The input shaft 22 powers the planetary gear set 24 that includes a ring gear 26, a sun gear 28, and a planetary carrier assembly 30. More specifically, the input shaft 22 is driveably connected to the carrier assembly 30 to power the remaining portions of the planetary gear set 24.

A generator 32 ($M/G_2$) is driveably connected to the sun gear 28 of the planetary gear set 24. The generator 32 may be engaged with the sun gear 28, such that the generator 32 may either rotate with the sun gear 28, or not rotate with it. When the one way clutch couples the engine 18 to the planetary gear set 24, the generator 32 may generate energy as a reactionary element to the operation of the planetary gear set 24. Electric energy generated from the generator 32 is transferred to the battery 14 through electrical connections 36 where it is stored for later use such as, for example, propelling the vehicle or powering auxiliary components. The battery 14 may also receive and store electric energy through regenerative braking, in known fashion.

The battery 14, motor 16, and generator 32 are each interconnected in a two-way electric flow path through electrical connections 36 such that each component is electrically connected for propulsion and regenerative use. In one mode of propulsion, the battery 14 supplies the stored electric energy to the motor 16, causing the motor 16 to turn downstream components of the powertrain (described below). The engine 18 may also propel the vehicle by supplying a portion of power to the generator 32 that can transmit electric energy to the battery or directly to the motor 16. In another mode of propulsion, powering of the planetary gear set 24 from the engine 18 causes the ring gear 26 to transmit torque to the downstream components of the powertrain (described below). During this mode, the generator 32 may be decoupled from the planetary gear set 24 so that it does not generate electric power (e.g., when the battery 14 has a high state of charge). If no selective decoupling of the generator 32 is provided, the generator 32 may provide a reactionary or negative torque when the battery 14 state of charge is high.

A continuous torque transfer member 40 transfers torque output from either or both of the engine 18 and the motor 16. The continuous torque transfer member 40 may be a chain, belt, or other mechanical loop having an input (drive) region and an output (driven) region. The continuous torque transfer member 40 mechanically couples the output of the engine 18 and/or motor 16 to a differential 42. More particularly, the ring gear 26 and the motor 16 both provide mechanical output to a shaft 44 that extends through a drive member 46, such as a sprocket or the like. The drive member 46 may be disposed between both the ring gear 26 and the motor 16 such that it receives torque from either side. Alternatively, the motor 16 may be placed on the same side of the drive member 46 as the ring gear 26. The drive member 46 drives a driven member 48 (e.g., another sprocket) via the mechanical coupling with the continuous torque transfer member 40. Coupled to the continuous torque transfer member 40 at an opposite end from the shaft 44 is the differential 42 which receives torque and distributes it to and between the drive wheels 52 of the vehicle.

Given the description above of a power-split hybrid, it should be clear that there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

It should be understood that the power-split vehicle of FIG. 1 is merely exemplary and the present disclosure is not intended to be limited to such an arrangement. Other power-split vehicle architectures are contemplated to be within the scope of the control strategy of the present disclosure. However, in all embodiments, it should be understood that a continuous torque transfer member is provided (instead of a torque reduction gear set) to deliver torque from the torque-producing elements toward the wheels.

When either or both power sources work to provide torque toward the wheels, the torque is transmitted through the continuous torque transfer member 40. The combined torque, which is ultimately sent to the wheels, is a sum of the torque provided by the motor 16 (motor torque) and the torque provided from the ring gear 26 (ring gear torque), as represented in equation (1) below:

$$T_{wheel} = T_{ring} + T_{motor} \quad (1)$$

The amount of ring gear torque depends on the reaction torque provided by the generator 32, which in turn depends on the engine torque and the amount by which the commanded engine speed is changing. It follows that the maximum available wheel torque occurs when the motor 16 and engine 18 each deliver full torque.

Desired engine power is scheduled based on Equation (2) below:

$$P_{eng\_des} = P_{wheel\_des} + P_{losses} + P_{accessory} - P_{battery} \quad (2)$$

where $P_{wheel\_des}$ is the desired wheel power, $P_{losses}$ is the expected electrical losses, $P_{accessory}$ is the electrical accessory loads (e.g., HVAC, radio, etc.), and $P_{battery}$ is the desired level of battery charge or discharge for state of charge (SOC) management.

Figure 2A:
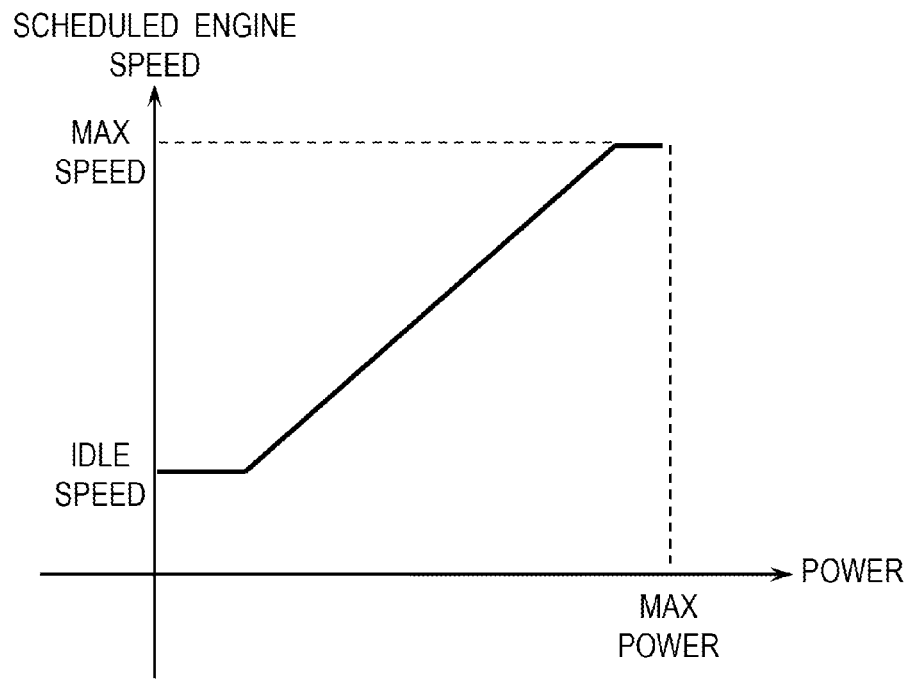
FIGS. 2A and 2B are graphical illustrations of scheduled engine speed and scheduled engine torque versus desired engine power.
Figure 2B:
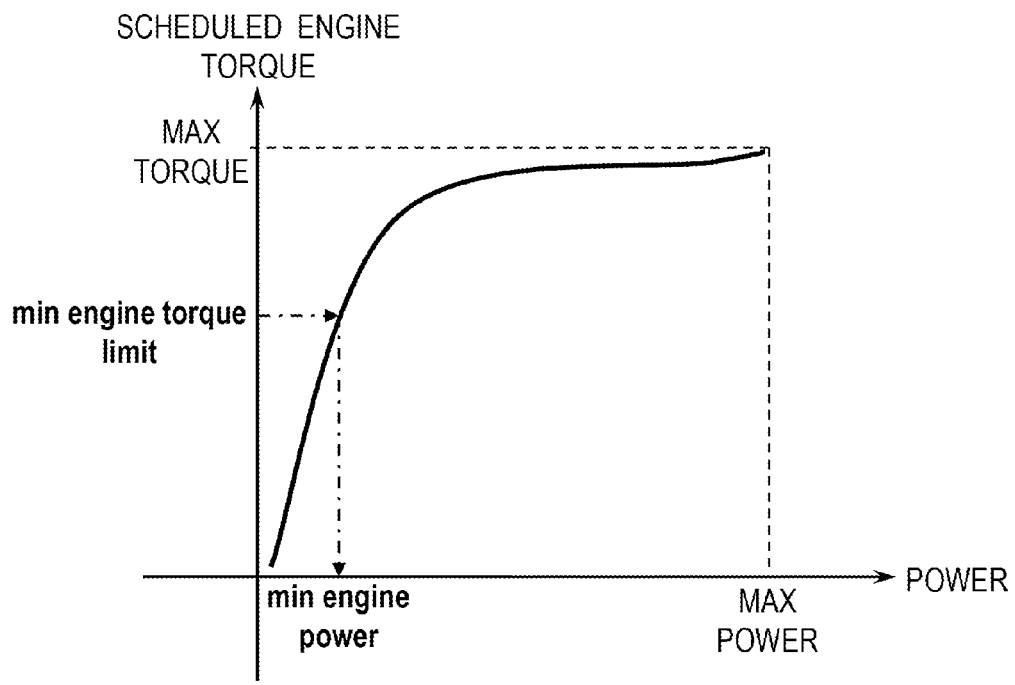

Given the desired engine power, engine speed and torque are scheduled through a map which is designed to deliver the scheduled engine speed and torque at an efficient engine speed set-point. FIG. 2A illustrates a scheduled engine speed map and FIG. 2B illustrates a scheduled engine torque map selected during operation given the above criteria. (FIG. 2B also includes minimum engine torque limit and minimum engine power lines as will be described further below.)

Particularly at low vehicle speeds, a situation may arise in which the amount of wheel power may be relatively small while the wheel torque demand is relatively large. For example, such a scenario exists when the operator of the vehicle demands a quick full acceleration (full pedal accelerator pedal depression) when the vehicle is stopped. At the time of the initial acceleration demand, the wheel speed is zero and hence the wheel power is also zero, yet the wheel torque demand is at a maximum. Another similar situation may arise when the vehicle is at low or zero speed while on sand or gravel, and the vehicle operator sharply depresses the accelerator pedal. According to various embodiments of the present disclosure, the controller 12 is programmed to maximize the wheel torque delivered in situations such as those described above.

Provided that the requested wheel torque at full accelerator pedal depression is at least as large as the sum of the maximum available motor torque and the maximum available engine torque, the control strategy provided herein will ensure that wheel torque is maximized at full accelerator pedal depression. It will also ensure that the requested wheel power is achievable under part-pedal operation. One example of an algorithm utilized and implemented by the controller 12 is illustrated and described with reference to FIGS. 3 and 4.

Figure 3:
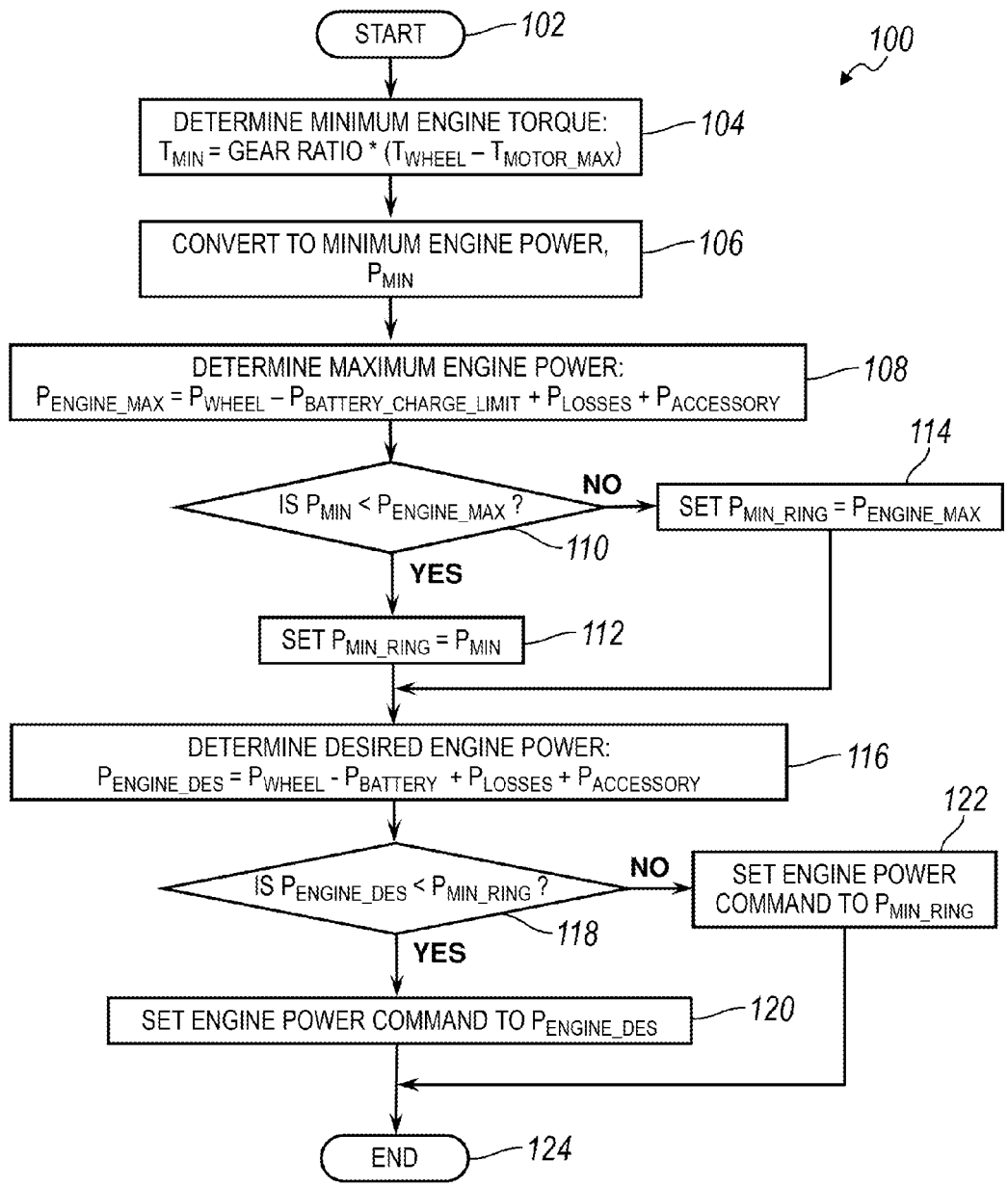
FIG. 3 is a flow chart of a control strategy implemented by at least one controller for controlling engine output to deliver sufficient ring gear torque, according to one embodiment.
Figure 4:
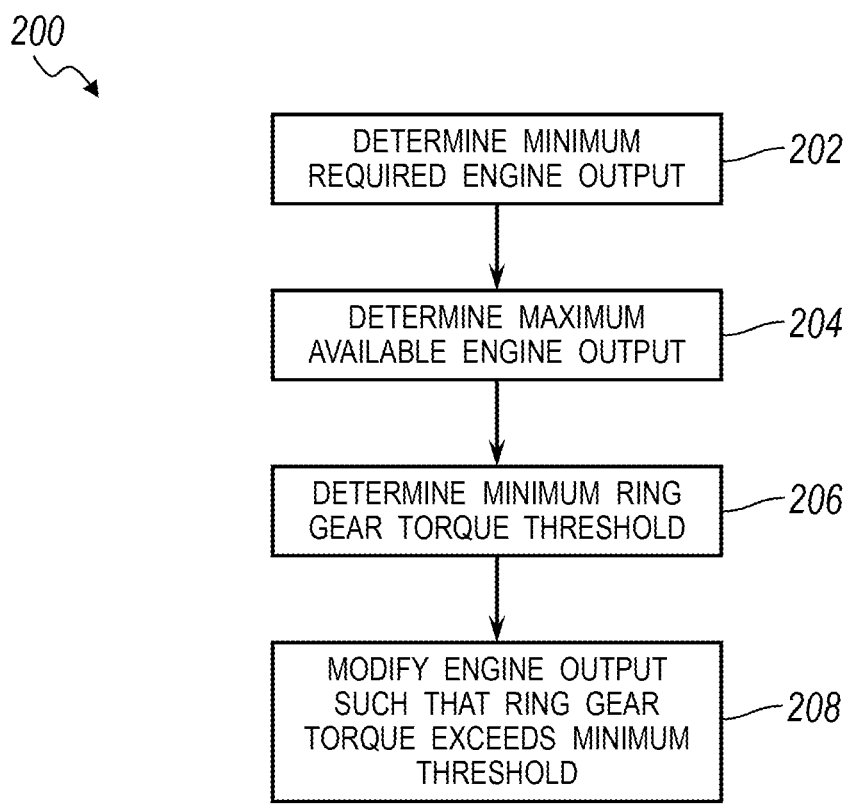
FIG. 4 is another flow chart of a control strategy implemented by at least one controller for controlling engine output to deliver sufficient ring gear torque, according to one embodiment.

FIGS. 3 and 4 are diagrams illustrating operation of a system or method for controlling a vehicle according to embodiments of this disclosure. As those of ordinary skill in the art will understand, the operations or functions represented in FIGS. 3 and 4 may be performed by software and/or hardware depending on the particular application and implementation. The various operations or functions may be performed in an order or sequence other than explicitly illustrated and described, which may depend upon the particular processing strategy, such as event-driven, interrupt-driven, etc. Similarly, one or more operations, tasks, or functions may be repeatedly performed, performed in parallel, and/or omitted under particular operating conditions or in particular applications, although not explicitly illustrated. In one embodiment, the operations illustrated are primarily implemented by software, instructions, or code stored in a non-transitory computer readable storage device and executed by one or more microprocessor-based computers or controllers to control operation of the associated vehicle components.

Referring to FIG. 3, one exemplary algorithm 100 starts at 102 in response to, for example, a high torque demand at low vehicle speeds and wheel power, as explained above. First, at 104, a minimum engine torque output limit ($T_{engine\_min}$) is determined. The minimum engine torque output limit ensures that the torque output by the engine is sufficient to meet the demanded wheel torque. Using a maximum motor torque limit ($T_{motor\_max}$), and assuming that engine speed is constant, for a given wheel torque demand the engine torque should exceed the product of the gear ratio and the difference between the wheel torque and the motor torque limit as represented by the following relationship:

$$T_{engine\_min} \geq \text{gear ratio} * (T_{wheel} - T_{motor\_max}) \quad (3)$$

where the gear ratio is a function of the difference between the drive member 46 and the driven member 48 if gears are provided. Of course, other mechanisms can be utilized that provide a change in rotational speed between the shaft 44 and the input to the differential, which should be accounted for in Equation (3). If there is no gear difference between the drive member 46 and the driven member 48 and the continuous torque transfer member translates the torque at a 1:1 ratio, then this term can be removed. In such a scenario, the minimum engine torque output limit corresponds directly to the difference between the torque at the wheels and the maximum motor torque limit.

At 106, with the minimum engine torque determined, a minimum engine power ($P_{min}$) can be determined using the map in FIG. 2B. The minimum engine power represents the minimum amount of power required to meet the wheel torque demands during the desired acceleration event.

At 108, the maximum limit of engine power ($P_{engine\_max}$) to prevent battery overcharging is determined. This value represents the maximum amount of engine power that is allowable to be transferred by the engine while considering the maximum rate at which the battery can accept charging. The maximum engine power to prevent battery overcharging may be calculated and capped using Equation (4) below:

$$P_{engine\_max} = P_{wheel\_des} - P_{battery\_charge\_limit} + P_{losses} + P_{accessory} \quad (4)$$

where $P_{battery\_charge\_limit}$ is a maximum charge power limit, being the maximum rate at which the battery can accept charging, which may be limited by the design of the battery connector and battery chemistry.

The controller sets a maximum power limit as generally represented by blocks 110-114. If the minimum engine power required to meet the wheel torque demand is greater than the maximum available engine power (accounting for SOC overcharge prevention), then the minimum power transmitted through and from the ring gear and into the continuous torque transfer member is increased to be at least the maximum available engine power. More particularly, at 110, a comparison is made between $P_{min}$ and $P_{engine\_max}$. If the minimum engine power ($P_{min}$) is less than the maximum limit of engine power ($P_{engine\_max}$), then the controller sets a minimum ring power threshold ($P_{min\_ring}$) as the determined minimum engine power ($P_{min}$) at 112. If, however, the minimum engine power ($P_{min}$) exceeds the maximum limit of engine power ($P_{engine\_max}$), then the controller sets the threshold $P_{min\_ring}$ to be equal to the maximum limit of engine power ($P_{engine\_max}$) at 114.

At 116, the desired engine power ($P_{eng\_des}$) is determined using Equation (2) above.

Given the above description, it should be understood that if the desired engine power determined from the wheel power demand is less than the minimum engine power required to meet the wheel torque, the controller can increase the engine power demand to this value. This ultimately increases the power transmitted from the ring gear. If, however, the desired engine power determined from the wheel power demand already exceeds the minimum engine power required to meet the wheel torque, then no such action is required and the engine power demand can be maintained.

The engine power command can then be determined given the above parameters such that the engine can output power to meet the torque demand at the wheels, particularly at the low-speed, high-torque-demand situations described above. At 118, a comparison is made between the desired engine power ($P_{eng\_des}$) and the minimum ring power threshold ($P_{min\_ring}$) (determined as represented at 110-114). If the desired engine power exceeds the minimum ring power, the controller sets the engine power command at 120 to the desired engine power ($P_{eng\_des}$). If, however, the minimum ring power exceeds the desired engine power, then the controller sets the engine power command at 122 to the minimum ring power. The algorithm ends and can return at 124.

Steps 118-122 manage the engine power set and commanded by the controller such that the power output by the ring gear exceeds a threshold to provide the desired torque to the wheels.

FIG. 4 illustrates a simplified, higher-level control strategy or algorithm 200 that provides desired wheel torque according to embodiments of the disclosure. At 202, a minimum engine power output to meet wheel torque demand is determined. At 204, the current maximum available engine output is determined, similar to that shown at step 108. At 206, a minimum ring gear torque threshold is determined in similar fashion as described with reference to blocks 110-114. In particular, the minimum ring gear torque threshold corresponds to the lesser of the minimum engine power required to meet wheel torque demands and the maximum available engine power. At 208, the controller modifies the engine output such that the ring gear torque exceeds the minimum ring gear torque threshold.

Various embodiments of the present disclosure described above provide a strategy for altering engine output (power) to deliver ring gear torque to meet the demanded torque at the wheels. In short, the control strategy determines and modifies the engine power request such that the resultant ring gear torque exceeds an associated threshold. The ring gear threshold can be determined using a motor torque limit and a requested wheel torque, as detailed above. In some embodiments, the smallest engine power request is determined and provided that will result in scheduling an engine torque large enough to deliver the minimum ring gear torque. This smallest engine power amount provides desired wheel torque while considering engine efficiency. In some embodiments, the maximum engine power output can be determined based on the wheel power requests and battery charge limits.

When the engine output is altered to ensure the torque delivered by the ring gear is above a ring-gear-torque-threshold, torque is transmitted through the continuous torque transfer member and to the wheels to meet desired and demanded wheel torque.

It should be understood that references above to "torque" and "power," such as the minimum ring gear power threshold, can be interchanged by simple mathematical properties of the relationship of torque and power (power=torque*speed). Therefore, the minimum ring gear power threshold can also be a minimum ring gear torque threshold by simply dividing by the rotational speed. The present disclosure should not be limited to strict "power" thresholds or strict "torque" thresholds. One such example of a conversion is made between steps 104 and 106. According to the embodiments of the present disclosure, the engine power is modified to provide desired torque to the wheels.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a planetary gearset coupled to the engine and having a ring gear for transmitting a ring-gear torque to a differential;
   an electric machine configured to selectively output torque to the differential;
   a continuous torque transfer member (CTTM) extending about first and second sprockets, the CTTM operatively coupling the ring gear and the electric machine at the first sprocket to the differential at the second sprocket; and
   a controller configured to alter engine output based on a ring-gear-torque threshold such that a desired torque transfers through the CTTM to the differential.

2. The vehicle of claim 1, wherein the first sprocket is a drive member coupled to the CTTM to provide torque thereto, the drive member having a central shaft with a first end operatively coupled to the ring gear and a second end operatively coupled to the electric machine.

3. The vehicle of claim 1, wherein the controller is configured to alter the engine output based on the electric machine outputting torque at or near a maximum amount.

4. The vehicle of claim 1, wherein the controller is configured to alter the engine output further based on a requested wheel torque exceeding a sum of a maximum available motor torque and a maximum available engine torque.

5. The vehicle of claim 1, wherein the controller is further configured to increase the engine output based on a wheel torque being below a wheel-torque threshold.

6. The vehicle of claim 1, wherein the controller is further configured to increase the ring-gear torque above the ring-gear-torque threshold in response to a speed of the vehicle being below a vehicle-speed threshold and a wheel torque being below a wheel-torque threshold.

7. A method of controlling a vehicle having an engine operatively coupled to a differential via a planetary gearset ring gear and a continuous torque transfer member (CTTM) extending about first and second sprockets, and a motor operatively coupled to the differential via the CTTM, the method comprising:

increasing an output of the engine based on an amount of torque transmitted through the ring gear such that the torque is maintained above a ring-gear-torque threshold and transferred through the CTTM via the sprockets.

8. The method of claim 7, wherein the increasing includes increasing a minimum engine power threshold.

9. The method of claim 8, further comprising maintaining the output of the engine above the minimum engine power threshold such that the torque transmitted through the ring gear remains above the ring-gear-torque threshold at least until a demanded torque remains above a demanded-torque threshold.

10. The method of claim 7, wherein the increasing is initiated in response to a requested wheel torque exceeding a sum of a maximum available motor torque and a maximum available engine torque.

11. The method of claim 7, wherein the increasing is initiated in response to a speed of the vehicle being below a threshold when the ring-gear torque is below the threshold.

12. A vehicle comprising:
a planetary gearset coupled to an engine and having a ring gear for transmitting ring-gear torque to a differential;
a motor selectively operatively coupled to the differential;
a continuous torque transfer member (CTTM) extending about first and second sprockets and operatively coupling the ring gear and motor to the differential; and
a controller configured to increase engine output to maintain the ring-gear torque above a threshold to transfer torque through the CTTM.

13. The vehicle of claim 12, wherein the first sprocket is a drive member coupled to the continuous torque transfer member to provide torque thereto, the drive member having a central shaft operatively coupled to the ring gear on one end and to the motor on another end.

14. The vehicle of claim 12, wherein the controller is further configured to increase the output of the engine based on a speed of the vehicle being below a vehicle-speed threshold.

15. The vehicle of claim 14, wherein the threshold is a ring-gear-torque threshold, and the controller is further configured to maintain the output of the engine above an engine-output threshold such that the torque transmitted through the ring gear remains above the ring-gear-torque threshold at least until the vehicle speed remains below the vehicle-speed threshold.

16. The vehicle of claim 12, wherein the controller is further configured to increase the output of the engine based on a wheel torque being below a wheel-torque threshold.

17. The vehicle of claim 12, wherein the controller is further configured to increase the ring-gear torque above the threshold in response to a speed of the vehicle being below a vehicle-speed threshold and a wheel torque being below a wheel-torque threshold.

18. The vehicle of claim 1, further comprising a second motor connected to a sun gear of the planetary gearset.

19. The vehicle of claim 12, further comprising a second motor connected to a sun gear of the planetary gearset.

* * * * *